(12) United States Patent
Steele et al.

(10) Patent No.: US 6,224,382 B1
(45) Date of Patent: May 1, 2001

(54) METHOD AND APPARATUS FOR DEVELOPING COMPUTER SCREEN LAYOUT

(75) Inventors: Richard H. Steele, Bloomfield Hills; David Boatright, Troy, both of MI (US)

(73) Assignee: Prosoft, Inc., Bloomfield Hills, MI (US)

( * ) Notice: Subject to any disclaimer, the term of this patent is extended or adjusted under 35 U.S.C. 154(b) by 0 days.

(21) Appl. No.: 09/281,551

(22) Filed: Mar. 30, 1999

(51) Int. Cl.[7] .................................................. G09B 19/00
(52) U.S. Cl. ........................ 434/118; 434/365; 434/379; 446/901; 345/904
(58) Field of Search .................................. 434/72, 73, 75, 434/80, 81, 90, 98, 110, 118, 130, 150–152, 159, 171, 177, 192, 211, 219, 224, 307 R, 308, 365, 379, 401, 406, 416, 430; 446/26, 73, 369, 901; 273/157 R, 239, 272, 282.1, 282.2, 299; 345/146, 160, 173, 302, 326, 330, 333, 334, 340, 347–350, 501, 904; 707/200, 512, 515–517, 520, 521, 526, 530; 40/124.2, 124.5, 409, 426, 581, 621, 661.01, 778; 283/43, 117; 402/502; 428/100; 206/232; 348/179; 349/23; 335/302

(56) References Cited

U.S. PATENT DOCUMENTS

| | | | |
|---|---|---|---|
| 3,382,590 | * | 5/1968 | Mitchell ................................ 434/430 |
| 3,423,846 | * | 1/1969 | Arend .................................... 434/379 |
| 3,540,135 | * | 11/1970 | Alcosser et al. ..................... 434/118 |
| 3,647,279 | * | 3/1972 | Sharpless et al. ..................... 349/23 |
| 3,716,935 | * | 2/1973 | Friederichs ............................ 40/621 |
| 3,768,177 | * | 10/1973 | Thomas ................................... 434/81 |
| 4,124,943 | * | 11/1978 | Mitchell et al. ................... 434/307 R |
| 4,157,757 | * | 6/1979 | Gallaher, Jr. .......................... 206/232 |
| 4,330,951 | * | 5/1982 | Hauer .................................... 40/124.2 |
| 4,337,048 | * | 6/1982 | Hatch et al. .......................... 434/219 |
| 4,348,188 | * | 9/1982 | Ahrens ..................................... 434/72 |
| 4,686,522 | * | 8/1987 | Hernandez et al. ................. 345/160 |
| 4,937,181 | * | 6/1990 | Rogers ................................... 434/150 |
| 5,202,828 | * | 4/1993 | Vertelney et al. ................... 707/530 |
| 5,214,755 | * | 5/1993 | Mason ................................... 707/520 |
| 5,282,631 | * | 2/1994 | Baker .................................... 273/272 |
| 5,540,609 | * | 7/1996 | Hoag ...................................... 446/26 |
| 5,572,728 | * | 11/1996 | Tada et al. ............................ 707/200 |
| 5,638,117 | * | 6/1997 | Engeldrum et al. ................. 348/179 |
| 5,835,919 | * | 11/1998 | Stern et al. ........................... 707/515 |

FOREIGN PATENT DOCUMENTS

| | | | |
|---|---|---|---|
| 2052826 | * | 1/1981 | (GB) . |
| 2090037 | * | 6/1982 | (GB) . |
| 2128104 | * | 4/1984 | (GB) . |
| 55-53736 | * | 4/1980 | (JP) . |
| 59-225480 | * | 12/1984 | (JP) . |
| 2-196275 | * | 8/1990 | (JP) . |
| 2-284194 | * | 11/1990 | (JP) . |
| 3-161786 | * | 7/1991 | (JP) . |
| 3-168682 | * | 7/1991 | (JP) . |

* cited by examiner

*Primary Examiner*—Joe H. Cheng
(74) *Attorney, Agent, or Firm*—Carlson, Gaskey & Olds

(57) ABSTRACT

A method and apparatus for developing a computer screen layout provides a plurality of physically manipulable pieces each representing one of a plurality of computer screen objects. The pieces are removably secured to a surface representing a computer screen. The pieces are arranged on the surface to provide a proposed computer screen layout. The pieces may then be moved on the surface, added to the surface, or removed from the surface to provide a revised computer screen layout. The revised computer screen layout is then recreated in the computer program under development.

12 Claims, 3 Drawing Sheets

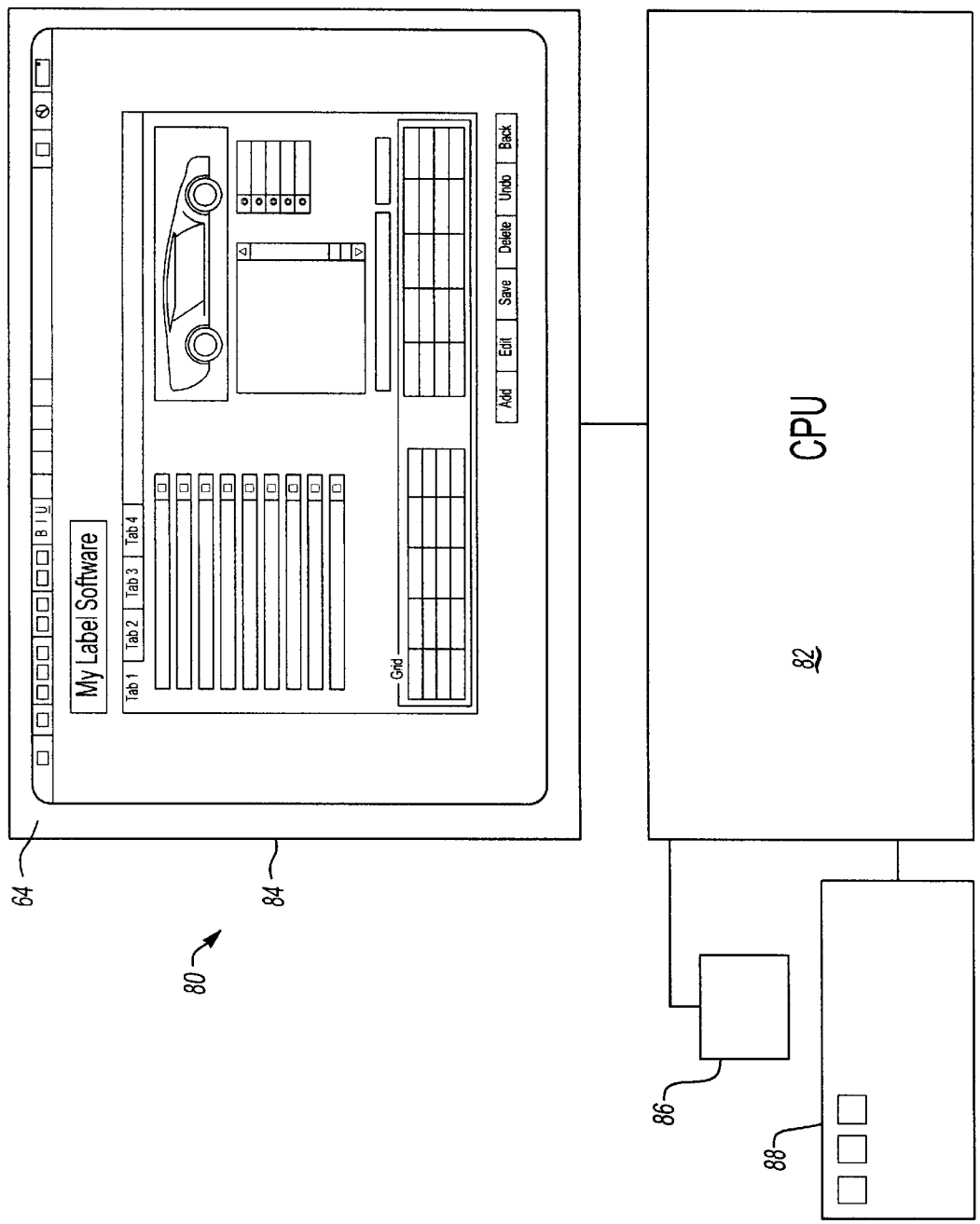

METHOD AND APPARATUS FOR DEVELOPING COMPUTER SCREEN LAYOUT

BACKGROUND OF THE INVENTION

The present invention relates generally to the development of computer screen layouts and more particularly to a method and apparatus for assisting in the development of a computer screen layout.

Computer software developers often have to optimize or customize the layout of the computer screen. For example, when customizing a computer database program, the computer software developer often must design several data entry and/or data output screens. Each screen contains a plurality of objects of many different types arranged on the screen. The computer software developer optimizes the location, placement and selection of those screen objects on the screen. For example, screen objects include data entry fields, data output fields, buttons, pulldown menus, pop-up menus, toolbars, etc.

The objects on the screen are arranged by the computer software developer based upon both ergonomics and aesthetics, but the final approval of the computer screen layout must be made by the client of the computer software developer. Thus, the computer software developer typically develops the computer screen layouts on the computer program and submits them to the client for approval. If the client does not approve, the computer software developer must go back to the computer and revise the computer screen layout. The computer screen layout may go through several iterations of revisions. Generally, this process is time consuming and inefficient.

Computer software has been developed which permits the computer software developer to manipulate "dummy" objects on a computer screen in a separate computer program. These screens may be printed and submitted to the customer for approval. After approval, the computer software developer recreates the approved screen in the final product.

SUMMARY OF THE INVENTION

The present invention provides a method and apparatus for developing a computer screen layout without the use of a computer. The method and apparatus of the present invention provide a simple, quick and efficient manner for finalizing a computer layout.

The present invention provides a plurality of physically manipulable pieces, each independently movable relative to a surface representing a computer screen. Each piece includes indicia representing one of a plurality of computer screen object types, such as input fields, output fields, buttons, toolbars, pulldown menus, pop-up menus, etc. Preferably, there are a plurality of pieces of each computer screen object type. Preferably, each of the pieces is removably secured to the surface, such as by magnetics, velcro, adhesive, etc.

The surface may comprise a magnetic board which is bound with a plurality of other boards, such as in a three ring binder. Preferably, the binder includes containers for storing the pieces. Further, a frame overlay is preferably bound adjacent each board.

According to the method of the present invention, a computer screen layout is developed by arranging a plurality of the pieces, each representing one of a plurality of computer screen object types, on one of the surfaces. Upon presentation of the computer screen layout to the client, the computer software developer can quickly and efficiently make major or minor revisions to the computer screen layout simply by moving the pieces on the surface or by adding or removing pieces to the surface. When a computer screen layout is approved, the computer software developer recreates the layout in the computer program. The plurality of surfaces can be utilized to develop a plurality of computer screen layouts.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 illustrates a computer programmed according to the method of the present invention, utilizing the computer screen layout development tool of FIGS. 1 and 2.

DETAILED DESCRIPTION OF A PREFERRED EMBODIMENT

Figure 1:
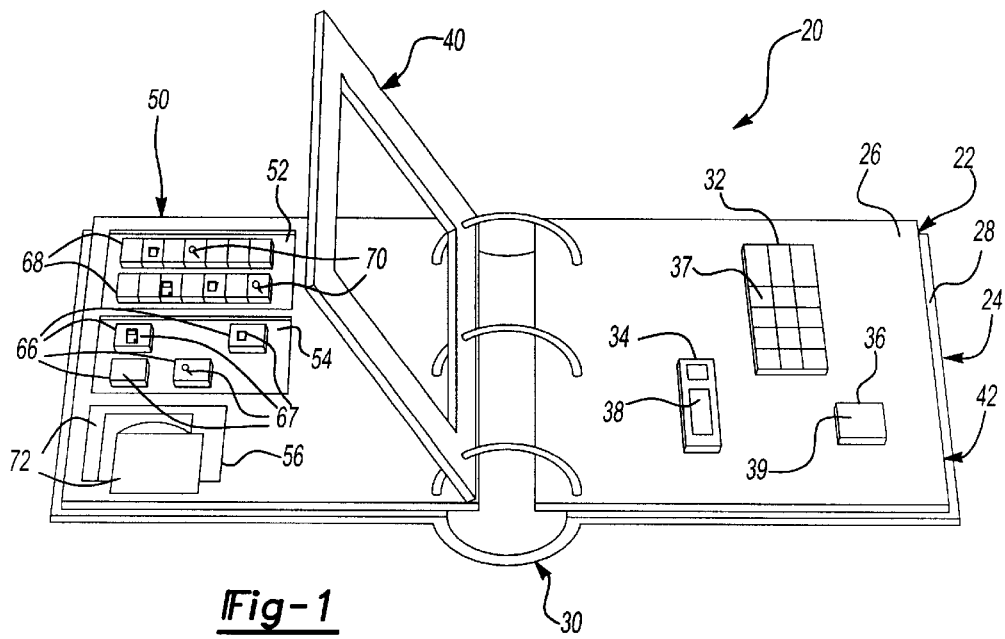
FIG. 1 illustrates the computer screen layout development tool of the present invention.

The present invention provides a computer screen layout development tool 20 as shown in FIG. 1. The computer screen layout development tool 20 includes a plurality (two shown) of boards 22, 24 each having a surface 26, 28, respectively. The boards 22, 24 are hingeably bound, such as by a three-ring binder 30. The boards 22, 24 are preferably magnetic.

A plurality of physically manipulable pieces 32, 34 and 36 are provided on the surface 26 (and surface 28, not shown). The pieces 32 are preferably each magnetized and include indicia 37, 38 and 39, respectively, representing computer screen objects. For example, the indicia 37 on piece 32 represents a grid for data input or output. The indicia 38 on piece 34 represents a text field and the indicia 39 on piece 36 represents a button. Because the pieces 32, 34 and 36 are magnetized, they are removably secured but movable relative to the surface 26. Alternatively, the pieces could be secured by Velcro, removable adhesive, static or otherwise removably secured to the surface 26.

A computer screen frame overlay 40 is also hingeably secured in the three-ring binder 30 adjacent the board 22. A second computer screen frame overlay 42 is hingeably secured in the three-ring binder 30 adjacent the surface 28 of the second board 24.

A container 50, such as a page of pockets 52, 54 and 56 is also bound in the three-ring binder 30. Each of the pockets 52, 54 and 56 contains a plurality of additional pieces 66, 68 and 72 which are likewise magnetized and include indicia 67, 70 and 74, respectively, representing computer screen objects.

Figure 2:
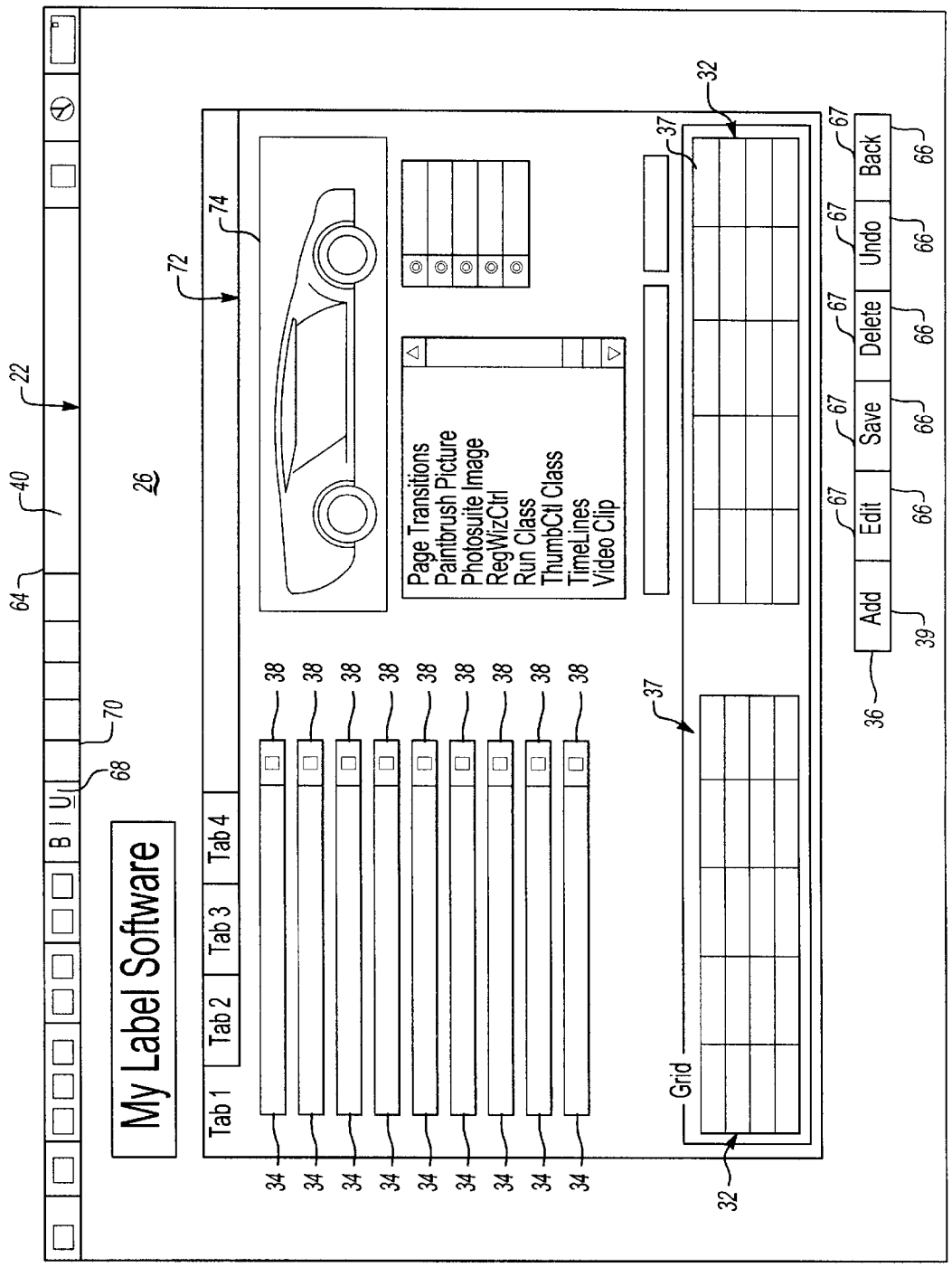
FIG. 2 illustrates one work surface of the computer screen layout development tool of FIG. 1.

The method of using the computer screen layout tool 20 of the present invention is described with respect to FIGS. 2 and 3. FIG. 2 illustrates the surface 26 of the first board 22 having the pieces 32, 34 and 36 arranged thereon to represent a proposed computer screen layout 64. Additional pieces 66 having indicia 67 representing buttons are also arranged in the proposed computer screen layout 64.

Another piece 68 includes indicia 70 representing a computer screen tool bar, as shown. Another piece 72 includes indicia 74 of a picture output screen. Of course, any computer screen object could be represented in a similar manner as indicia on a piece which is moveable and preferably removably secured to the surface 26. In this manner, the pieces, 32, 34, 36, 66, 68 and 72 may be arranged and moved on the surface 26 to represent the proposed computer screen layout 64. The computer screen overlay 40 is placed upon the surface 26 to further give the impression of how the finished computer screen would look.

After the computer software developer develops the proposed computer screen layout 64 as described above, another proposed computer screen layout may also be developed on the second board 24 (FIG. 1). The computer screen layout development tool 20 may then be used to present the proposed screen layouts 64 to the client. If the client has comments or suggested changes, the developer can quickly move the pieces 32, 34, 36, 66, 68 and 72 on the surface 26 or add or remove pieces or add pieces from container 50 to the surface 26 until a revised proposed computer screen layout is developed that is acceptable to the client. The computer software developer then presents and revises (if necessary) the proposed computer screen layout on the second board 24 in a similar manner.

The developer then programs a computer 80, such as is shown in FIG. 3 to reproduce the proposed (and accepted) computer screen layout 64 in the final product computer program, i.e., such as a database program. The computer 80 includes a CPU 82 connected to and driving a display 84 to display the proposed computer screen 64. The CPU 82 receives input from input devices, such as a mouse 86 and keyboard 88.

Utilizing the computer screen layout development tool 20 of the present invention and the method of the present invention, the computer software developer can more quickly and efficiently develop a computer screen layout which is acceptable to a client.

Figure 4:
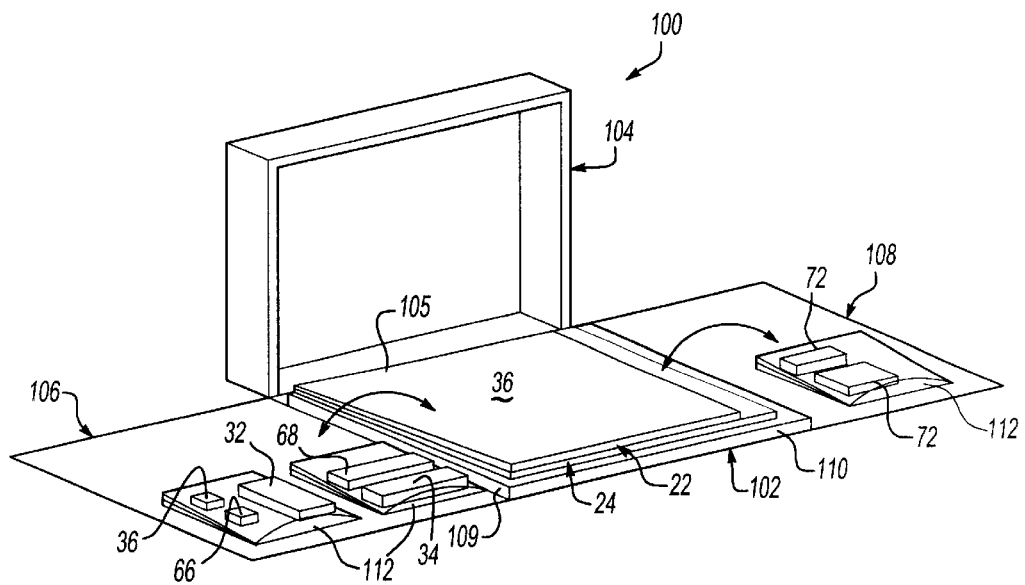
FIG. 4 illustrates an alternative computer screen layout development tool of the present invention.

An alternative computer screen development tool 100 is shown in FIG. 4 including a base 102 connected to a cover 104 by a horizontal hinge 105. The boards 22, 24, which may be identical to the boards 22, 24 shown in FIG. 1, are also hingeably connected to the base 102 and cover 104 at the horizontal hinge line 105. Two containers 106, 108 are connected by vertical hinge lines 109, 110 to the base 102. The containers 106, 108 each include pockets 112 containing the pieces 32, 34, 36, 66, 68 and 72. In this embodiment, the containers 106, 108 are folded along the vertical hinge lines 109, 110 onto the surface 26 of the first board 22. The cover 104 is then folded along the horizontal hinge line 105 to store the boards 22, 24 and containers 106, 108.

During use, the cover 104 is opened and the containers 106, 108 are folded out to reveal the surface 26 of the board 22. The board 22 may be flipped up along horizontal hinge line 105 to reveal board 24.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A computer screen layout development tool comprising:

a surface representing a computer screen;

a plurality of physically manipulable pieces, each movable relative to the surface to provide a proposed computer screen layout;

indicia disposed on each of the plurality of pieces, each representing one of a plurality of computer screen object types; and programming means for programming a computer to provide a programmed computer screen layout based upon the proposed computer screen layout.

2. The computer screen layout development tool of claim 1, wherein each of the plurality of pieces is removably secured to the surface.

3. The computer screen layout development tool of claim 2, wherein each of the pieces is magnetized and said surface is magnetic.

4. The computer screen layout development tool of claim 1, further including a frame overlay hingeably connected to said surface and selectively movable onto said surface over said pieces on said surface.

5. The computer screen layout development tool of claim 1, further including a container hingeably secured to said surface, a subset of said plurality of pieces disposed in said container.

6. A method for developing a computer screen layout including the steps of:

placing a plurality of physically manipulable pieces on a surface representing a computer screen, each of the pieces including indicia representing one of a plurality of computer screen objects;

arranging the pieces on the surface to provide a proposed computer screen layout; and programming a computer to provide a programmed computer screen layout based upon the proposed computer screen layout.

7. The method according to claim 6, further including the steps of:

moving the pieces on the surface to provide a revised computer screen layout; and programming the computer based upon the revised computer screen layout.

8. The method according to claim 6, further including the step of removably securing each of the plurality of pieces to the surface.

9. The method according to claim 8, further including the step of magnetically securing each of the plurality of pieces to the surface.

10. A method for developing a computer screen layout including the steps of:

a) placing a plurality of physically manipulable pieces on a surface representing a computer screen, each of the pieces including indicia representing one of a plurality of computer screen objects;

b) arranging the pieces on the surface to provide a proposed computer screen layout;

c) moving the pieces on the surface to provide a revised computer screen layout after said step b); and d) programming the computer based upon the revised computer screen layout.

11. The method according to claim 10, further including the step of removably securing each of the plurality of pieces to the surface.

12. The method according to claim 11, further including the step of magnetically securing each of the plurality of pieces to the surface.

* * * * *